(12) United States Patent
Dunsmoir et al.

(10) Patent No.: US 7,016,977 B1
(45) Date of Patent: Mar. 21, 2006

(54) METHOD AND SYSTEM FOR MULTILINGUAL WEB SERVER

(75) Inventors: John W. Dunsmoir, Round Rock, TX (US); Sandra H. Jacobs, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/434,797

(22) Filed: Nov. 5, 1999

(51) Int. Cl.
*G06F 15/16* (2006.01)

(52) U.S. Cl. ............... 709/246; 709/201; 709/217; 709/246; 704/2; 704/3; 704/9; 707/4; 707/5; 707/10

(58) Field of Classification Search ............... 709/217, 709/246; 707/5, 10, 513; 704/2, 3, 9
See application file for complete search history.

(56) References Cited

U.S. PATENT DOCUMENTS

| | | | |
|---|---|---|---|
| 5,379,373 A * | 1/1995 | Hayashi et al. | |
| 5,944,790 A * | 8/1999 | Levy | |
| 5,987,401 A * | 11/1999 | Trudeau | |
| 6,006,221 A * | 12/1999 | Liddy et al. | |
| 6,092,035 A * | 7/2000 | Kurachi et al. | |
| 6,098,092 A * | 8/2000 | Padzensky | |
| 6,167,369 A * | 12/2000 | Schulze | |
| 6,189,045 B1 * | 2/2001 | O'Shea et al. | |
| 6,292,827 B1 * | 9/2001 | Raz | |
| 6,321,372 B1 * | 11/2001 | Poirier et al. | |
| 6,347,316 B1 * | 2/2002 | Redpath | |
| 6,381,598 B1 * | 4/2002 | Williamowski et al. | |

OTHER PUBLICATIONS

"Effectiveness and efficiency: the need for tailorable user interfaces on the Web", Wolfgang Appelt, et al., Computer Networks and ISDN Systems 30 (1998), pp. 409-508.

"Tool to Aid Translation of Web Pages into Different National Languages", IBM Technical Disclosure Bulletin, vol. 41, No. 01, Jan. 1998, pp. 223-224.

"JESSICA: an object-oriented hypermedia publishing processor" by Robert A. Barta, et al., Computer Networks and IDSN Systems 30 (1998), pp. 281-290.

* cited by examiner

*Primary Examiner*—Saleh Najjar
*Assistant Examiner*—Michael Won
(74) *Attorney, Agent, or Firm*—Robert H. Frantz; David A. Mims, Jr.

(57) ABSTRACT

The method, system and computer program product disclosed herein provides a web server capability to produce translated web pages in alternate languages based on an extraction of the web page layout from an original web page, and mapping of alternate language content into the web page layout. The invention as disclosed is especially suitable for use on the World Wide Web with HTML documents, and is well adapted for real-time translation operation on a web server in order to decrease the storage requirements for multi-language web sites.

33 Claims, 2 Drawing Sheets

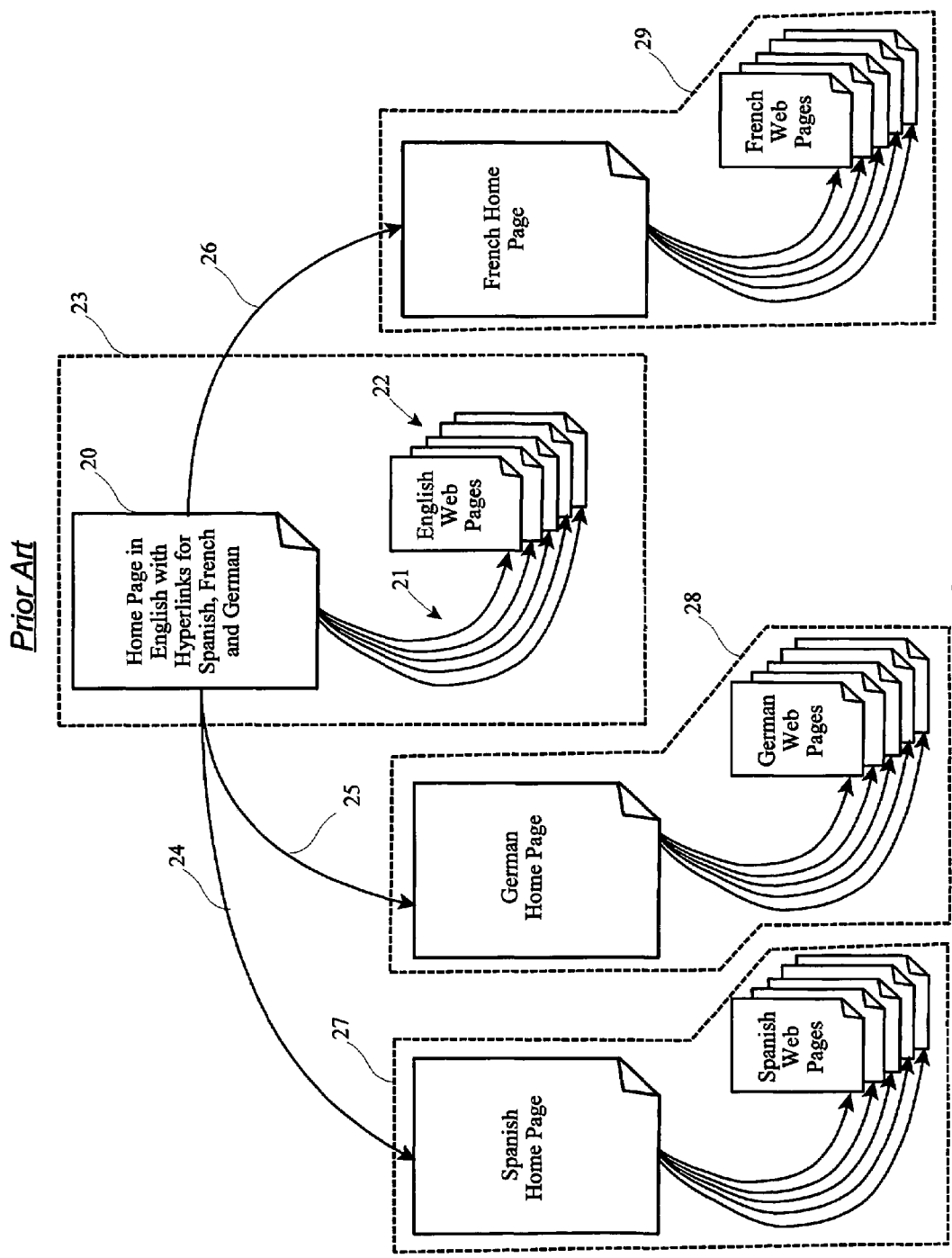

METHOD AND SYSTEM FOR MULTILINGUAL WEB SERVER

CROSS-REFERENCE TO RELATED APPLICATIONS (CLAIMING BENEFIT UNDER 35 U.S.C. 120)

This application is related to U.S. application Ser. No. 09/435,004, filed on Nov. 5, 1999, by John W. Dunsmoir, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related application, filed on Nov. 5, 1999, application Ser. No. 09/435,004, by John W. Dunsmoir, et al., is incorporated herein by reference in its entirety, including drawings, and hereby are made a part of this application.

BACKGROUND OF THE INVENTION

1. Field of the Invention

This invention pertains to the arts of electronic web site technology, and especially to the art of providing web site content in multiple languages.

2. Description of the Related Art

As described in the related application, the use of the World Wide Web ("WWW") has grown dramatically and is expected to continue to grow as more businesses, government agencies, educational institutions, and private consumers become web users and web site owners. As this has swept through the US, across Europe, and throughout industrialized Asia, the problem of providing web site content in multiple languages has increased. It is expected that as more countries around the world improve their telephone systems in order to allow better voice and data communications, the multi-lingual requirement for successful web site deployment will further increase.

As shown in FIG. 2, the common method for providing multi-lingual content is actually to provide multiple web sites within a web site. For example, a company's home page (20) may be primarily written and designed in English, but it may have hyperlinks to select alternate languages such as Spanish, German and French. If a user selected the Spanish hyperlink (24), he or she would then be transmitted the Spanish-only home page which resides at the top of the Spanish portion of the site map. Hyperlinks within the Spanish home page would lead to more pages of Spanish-only content. The same is true for a French hyperlink (26) and a German hyperlink (25) from the English home page (20). The English home page, of course, contains many other hyperlinks (21) to the English-only pages (22).

One can view this organization of documents as 4 linked web sites, an English web site (23), a French web site (29), a German web site (28) and a Spanish web site (27). Since each page of content must be designed separately to account for language-specific content and layout, the cost and time involved to develop and maintain a 4-language web site can be seen as approximately 4 times the cost to develop and maintain a single-language web site. If the web site content is bulky, such as web sites which contain significant graphics and video content, the system storage requirements for a multi-lingual web site may also approximate the multiple of the languages for a single web site storage requirement.

As maintenance of pages as they change will require changes in 4 pages for every one content change to be made, the maintenance issue can be considerable. So much so that real-time updates in multiple languages, such as real-time inclusion of news articles or stock quotes, can be impractical.

Therefore, there is a need in the art for a web server technology which enables multi-lingual web site content to be delivered to web browsers, but minimizes duplicate electronic content, allows for simultaneous maintenance actions, and provides a real-time capability to incorporate dynamic and changing information.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The method and system described relies upon the Boson and Quark servlet technologies embodied in a web server system. Using the Boson and Quark technology, a single-language web site is developed, consisting of one or many HTML pages. Also, a database or file system containing translations of the single-language content is provided, but without duplicating the content into complete HTML documents. During runtime of the web server, if a browser user selects an alternate language, the base pages from the single-language web site are processed real-time by the Boson servlet to extract layout definitions and to map into the returned documents the alternate language content. This reduces the number of pages to be maintained by allowing a single copy of the web site to be used as layout templates for all other alternate language web sites. This also allows for inclusion in real-time of dynamic, or changing content, such as news stories and stock quote. In a further refinement of the invention, the electronic source of the alternate language content, can be replaced with a network interface, which allows real-time inclusion of data from other web servers, such as streaming audio and video.

BRIEF DESCRIPTION OF THE DRAWINGS

The following detailed description when taken in conjunction with the figures presented herein present a complete description of the present invention.

FIG. 2 shows the basic prior art architecture of multi-lingual web sites.

DETAILED DESCRIPTION

Figure 1:
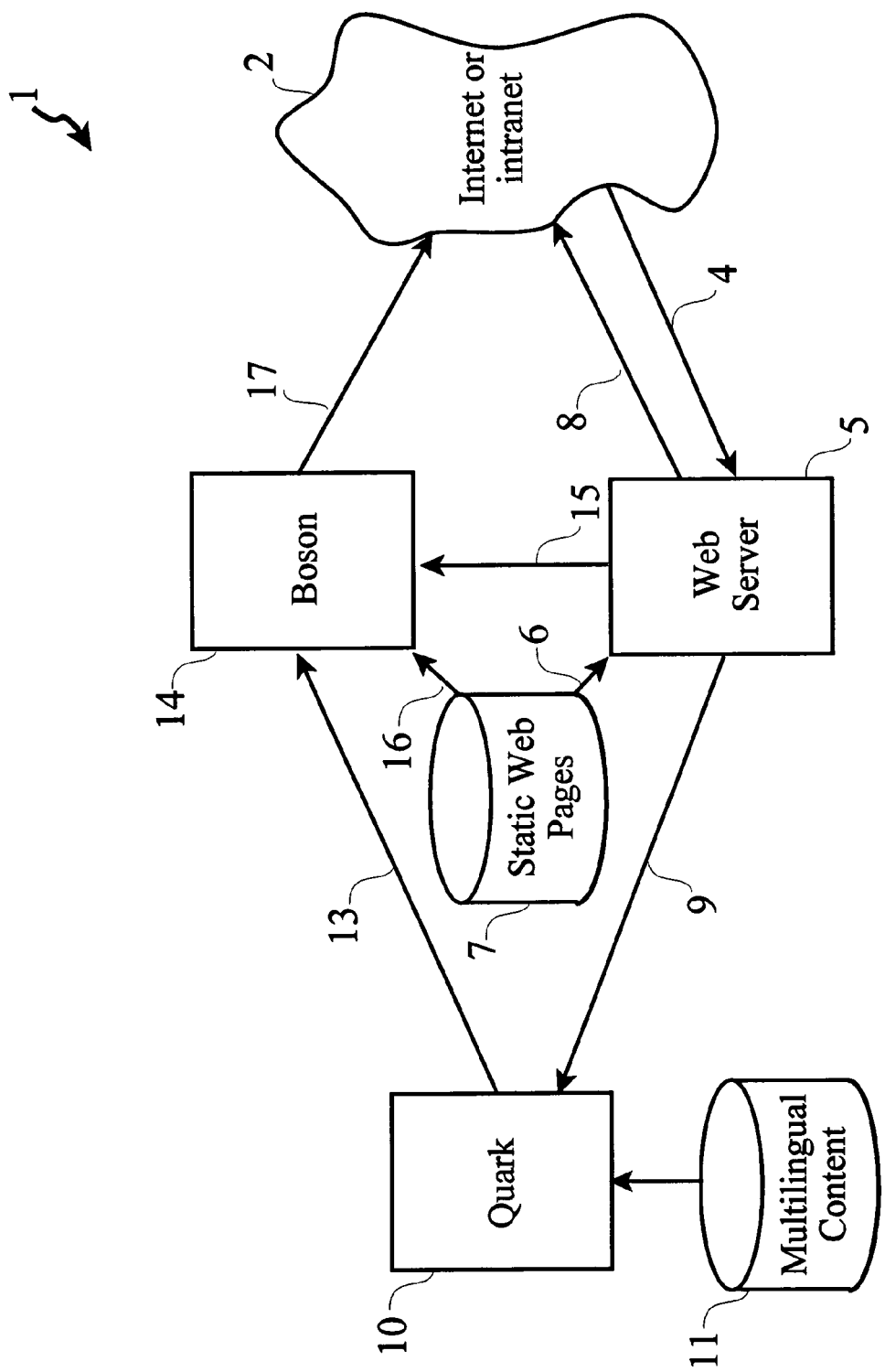
FIG. 1 discloses system architecture of the invention at hand.

The preferred embodiment of the invention is to realize the multi-lingual web site server on an IBM RS/6000 computer platform running a suitable operating system and web server software suite, such as the IBM AIX operating system and the IBM WebSphere Application Server product. Alternative computer platforms, web server software, and operating systems such as Microsoft NT or IBM OS/2, and IBM-compatible personal computers or Sun workstations, can be utilized, as well. Since the Boson/Quark technology described in the related application is preferably realized as a Java servlet, many web server platforms will meet the technical requirements of the multi-lingual web server invention.

In addition to the web server software suite and the Boson/Quark servlet, the inventive web server is provided with a database or file system containing a single-language web site, and a database or file system containing the suitable translations of the web site content (but not layout), including alternate graphics, photos, tables, text phrases, backgrounds, etc.

As shown in FIG. 1, the web server is configured to operate in the traditional, single-language manner and to utilize the Boson/Quark servlet to provide real-time translation to a selected language. The multi-lingual server (1) is provided with a suitable data connection (2) through which to correspond with one or more browser/client computers over the Internet or an intranet. When the browser is "pointed" to the base address or Universal Resource Locator ("URL") of the single-language web site, the web server suite (5) will receive a Hyper Text Transfer Protocol ("HTTP") "get" command. It will then retrieve (6) the home page HTML from a collection of static web pages (7), typically a mostly-single-language web page with hyperlinks or form fields for selecting an alternate language. This HTML "home page" will be returned (8) to the browser for viewing by the user. If the user selects hyperlinks or elects to continue in the language native to the base single-language collection of static web pages (7), the process continues as normal in the prior art technology, with multiple "gets" being received (4) by the web server (5), and the web server (5) retrieving (6) multiple HTML documents from the single-language collection static web pages (7) and transmitting (8) them to the browser machine.

However, if a user selects an alternate language, such as by selection of specific hyperlinks or input into a form field, the web server will then pass (15) to the Boson (14) servlet the name of the HTML file to be used from the static web page repository (7) as a layout template. Preferably, the choice of language is made by a server-to-browser query to retrieve the language set on the browser. Likewise, the Quark (10) will be passed (9) a handle for the appropriate alternate language content, which it will retrieve from the multi-lingual content database or file system (11). As described in the related application, the Quark (10) in cooperation (13) with the Boson (14) maps the alternate language content into the HTML template which is extracted from the single-language HTML page retrieved (16) from the single-language web site repository (7). The mapped and translated HTML page can then be returned (17) directly to the web browser over the Internet or intranet, or it can be returned to a computer readable storage, such as a file system, for the web server suite (5) to retrieve and transmit to the web browser. The latter option allows for the caching of translated documents to eliminate possible duplicate processing actions if two browsers request an alternate-language translation of the same page or pages within a short time of each other.

It will be understood from the foregoing description that various modifications and changes may be made in the preferred embodiment of the present invention without departing from its true spirit, such as the use of alternate web server platforms, operating systems and data storage means. It is intended that this description is for purposes of illustration only and should not be construed in a limiting sense. The scope of this invention should be limited only by the language of the following claims.

What is claimed is:

1. A method of producing alternate language web site content for a web site server having a plurality of web documents, each of said web documents containing content and layout definitions, said method comprising the steps of:
   receiving an alternate language key indicator;
   receiving at least one web page selection for translation; and
   producing at least one translated web page by extracting said layout definitions from at least one selected web page, followed by combining said extracted layout definitions with alternate language content.

2. A method of producing alternate language web site content according to claim 1, wherein said step of producing at least one translated web page further comprises the step of retrieving said alternate language content from computer-readable media.

3. A method of producing alternate language web site content according to claim 2, wherein said step of retrieving said alternate language content from computer-readable media comprises the step of retrieving said alternate language content from a computer database.

4. A method of producing alternate language web site content according to claim 2, wherein said step of retrieving said alternate language content from computer-readable media comprises the step of retrieving said alternate language content from a computer file system.

5. A method of producing alternate language web site content according to claim 2, wherein said step of retrieving said alternate language content from computer-readable media comprises the step of retrieving said alternate language content from a communications interface.

6. A method of producing alternate language web site content according to claim 2, wherein said step of retrieving said alternate language content from computer-readable media comprises the step of retrieving said alternate language content from a computer network.

7. A method of producing alternate language web site content according to claim 1, wherein said step of receiving an alternate language key indicator further comprises receiving an alternate language key indicator as the result of a selection action of a hyperlink.

8. A method of producing alternate language web site content according to claim 1, wherein said step of receiving an alternate language key indicator further comprises receiving an alternate language key indicator as the result of submission of a language choice by a web browser via a web form document.

9. A method of producing alternate language web site content according to claim 1, wherein said step of receiving an alternate language key indicator further comprises receiving an alternate language key indicator as the result a query by a web server to a web browser for the web browsers current language setting.

10. A method of producing alternate language web site content according to claim 1, wherein said step of receiving at least one web page selection for translation further comprises receiving a web page selection as the result of an activation of a hyperlink.

11. A method of producing alternate language web site content according to claim 1, wherein said step of receiving at least one web page selection for translation further comprises receiving web page selection as the result of submission of a web page reference by a web browser via a web form document.

12. A method of producing alternate language web site content according to claim 1, further comprising the step of storing said translated web page in a computer readable media.

13. A method of producing alternate language web site content according to claim 1, further comprising the step of transmitting said translated web page over a computer network.

14. A computer program product for use with a web server system to produce alternate language web pages, comprising:
- a computer usable medium having a computer readable program code means embodied in said medium for receiving an alternate language key indicator;
- a computer usable medium having a computer readable program code means embodied in said medium for receiving at least one web page selection for translation; and
- a computer usable medium having a computer readable program code means embodied in said medium for producing at least one translated web page by extracting said layout definitions from at least one selected web page, followed by combining said extracted layout definitions with alternate language content.

15. A computer program product according to claim 14 further comprising a computer usable medium having a computer readable program code means embodied in said medium for retrieving said alternate language content from computer-readable media.

16. A computer program product according to claim 15 wherein computer readable program code for retrieving said alternate language content from computer-readable media further comprises computer readable program code means for retrieving said alternate language content from a computer database.

17. A computer program product according to claim 15 wherein computer readable program code for retrieving said alternate language content from computer-readable media further comprises computer readable program code means for retrieving said alternate language content from a computer file system.

18. A computer program product according to claim 15 wherein computer readable program code for retrieving said alternate language content from computer-readable media further comprises computer readable program code means for retrieving said alternate language content from a communications interface.

19. A computer program product according to claim 15 wherein computer readable program code for retrieving said alternate language content from computer-readable media further comprises computer readable program code means for retrieving said alternate language content from a computer network.

20. A computer program product according to claim 14, wherein said computer readable program code for receiving an alternate language key indicator further comprises computer readable program code for receiving an alternate language key indicator as the result of a selection action of a hyperlink.

21. A computer program product according to claim 14, wherein said computer readable program code for receiving an alternate language key indicator further comprises computer readable program code for receiving an alternate language key indicator as the result of submission of a language choice by a web browser via a web form document.

22. A computer program product according to claim 14, wherein said computer readable program code for receiving an alternate language key indicator further comprises computer readable program code for receiving an alternate language key indicator as the result a query by a web server to a web browser for the web browsers current language setting.

23. A computer program product according to claim 14, wherein said computer readable program code for receiving at least one web page selection for translation further comprises computer readable program code for receiving a one web page selection as the result of an activation of a hyperlink.

24. A computer program product according to claim 14, wherein said computer readable program code for receiving at least one web page selection for translation further comprises computer readable program code for receiving a one web page selection as the result of submission of a web page reference by a web browser via a web form document.

25. A computer program product according to claim 14, further comprising computer readable program code embodied in said media for storing said translated web page in a computer readable media.

26. A computer program product according to claim 14, further computer readable program code embodied in said media for transmitting said translated web page over a computer network.

27. A system for providing access and language translation of web site content over a computer network, said system comprising:
- a web server platform having a computer means suitable for running software, a web server software suite including a web communications protocol, and a computer-readable web page storage means, and at least one web page disposed in said web page storage means, said web page having layout definition and content definition;
- a web page format extraction means for extracting a web page layout template from at least one web page disposed in said web page storage means; and
- a web page production means for combining alternate language content with said web page layout template, thereby producing an alternate language web page.

28. A system for providing access and language translation of web site content according to claim 27, further comprising a means for transmitting said alternate language web page over a computer network.

29. A system for providing access and language translation of web site content according to claim 27, further comprising a means for storing said alternate language web page in a computer readable medium.

30. A system for providing access and language translation of web site content according to claim 27, further comprising a means for retrieving said alternate language content from a computer-readable medium.

31. A system for providing access and language translation of web site content according to claim 30, wherein said means for retrieving said alternate language content from a computer-readable medium further comprises a means for retrieving said alternate language content from a computer database.

32. A system for providing access and language translation of web site content according to claim 30, wherein said means for retrieving said alternate language content from a computer-readable medium further comprises a means for retrieving said alternate language content from a computer file system.

33. A system for providing access and language translation of web site content according to claim 30, wherein said means for retrieving said alternate language content from a computer-readable medium further comprises a means for retrieving said alternate language content from a computer network.

* * * * *

UNITED STATES PATENT AND TRADEMARK OFFICE
CERTIFICATE OF CORRECTION

PATENT NO. : 7,016,977 B1  Page 1 of 1
APPLICATION NO. : 09/434797
DATED : March 21, 2006
INVENTOR(S) : John w. Dunsmoir It is certified that error appears in the above-identified patent and that said Letters Patent is hereby corrected as shown below:

PLEASE INSERT ITEM [76], Christopher Daniel Reech, Austin TX

Signed and Sealed this

Twenty-second Day of August, 2006

JON W. DUDAS
*Director of the United States Patent and Trademark Office*